United States Patent
Guardini et al.

(10) Patent No.: US 12,212,751 B1
(45) Date of Patent: Jan. 28, 2025

(54) VIDEO QUALITY IMPROVEMENTS SYSTEM AND METHOD FOR VIRTUAL REALITY

(71) Applicant: Cinova Media, Mountain View, CA (US)

(72) Inventors: Domenico Guardini, Mountain View, CA (US); Mike Hodges, Mountain View, CA (US); David Hopkins, Mountain View, CA (US); Anurag Mendhekar, Mountain View, CA (US); Pierre Seigneurbieux, Mountain View, CA (US)

(73) Assignee: Cinova Media, Mountain View, CA (US)

( * ) Notice: Subject to any disclaimer, the term of this patent is extended or adjusted under 35 U.S.C. 154(b) by 164 days.

(21) Appl. No.: 15/974,205

(22) Filed: May 8, 2018

Related U.S. Application Data (60) Provisional application No. 62/503,560, filed on May 9, 2017.

(51) Int. Cl.
*H01L 29/94* (2006.01)
*H04N 19/124* (2014.01)
*H04N 19/154* (2014.01)
*H04N 19/597* (2014.01)

(52) U.S. Cl.
CPC ......... *H04N 19/124* (2014.11); *H04N 19/154* (2014.11); *H04N 19/597* (2014.11)

(58) Field of Classification Search
CPC ... H04N 19/124; H04N 19/597; H04N 19/154
See application file for complete search history.

(56) References Cited

U.S. PATENT DOCUMENTS

| | | | |
|---|---|---|---|
| 5,596,659 A | | 1/1997 | Normile et al. |
| 5,703,799 A | | 12/1997 | Ohta |
| 5,856,832 A | | 1/1999 | Pakenham et al. |
| 5,872,572 A | * | 2/1999 | Rossignac ............... G06T 3/40 |
| | | | 345/428 |

(Continued)

FOREIGN PATENT DOCUMENTS

| | | |
|---|---|---|
| JP | 2003-018412 | 1/2003 |
| JP | 2004-173205 | 6/2004 |
| JP | 2007-104645 | 4/2007 |
| JP | 2007-318711 | 12/2007 |
| KR | 2003-0007080 | 1/2003 |
| KR | 2010-0918377 | 9/2009 |

(Continued)

OTHER PUBLICATIONS

Augustine, P., et al. entitled "Anatomical Distribution of Rods and Cones"—National Institutes of health, neuroscience, 2nd edition. Sunderland (MA); Sinauer Associates, dated 2001 retrieved from the web at https:/www.ncbi.nlm.nih.gov/books/NBK10848/ (2 pgs.).

(Continued)

*Primary Examiner* — Joseph Suh
(74) *Attorney, Agent, or Firm* — Manatt, Phelps & Phillips, LLP (57) ABSTRACT

A system and method for improving the quality of video for virtual reality systems uses several different techniques to improve the quality of the video. The different techniques may include quantization parameter maps, gradient scaling, using analytics to identify most view scenes and encode the most viewed scenes with better quality and adaptively shaping the field of view.

21 Claims, 9 Drawing Sheets

(56) References Cited

U.S. PATENT DOCUMENTS

| | | | |
|---|---|---|---|
| 5,900,849 A | 5/1999 | Gallery | |
| 6,016,360 A | 1/2000 | Nguyen et al. | |
| 6,052,205 A | 4/2000 | Matsuura | |
| 6,128,407 A | 10/2000 | Inoue et al. | |
| 6,304,295 B1 | 10/2001 | Krishnannurthy et al. | |
| 6,393,156 B1 | 5/2002 | Nguyen et al. | |
| 6,463,178 B1 | 10/2002 | Kondo et al. | |
| 6,466,254 B1 | 10/2002 | Furlan et al. | |
| 6,625,221 B2 | 9/2003 | Knee et al. | |
| 6,690,731 B1 | 2/2004 | Gough et al. | |
| 6,697,521 B2 | 2/2004 | Islam et al. | |
| 6,715,003 B1 | 3/2004 | Safai | |
| 6,792,153 B1 | 9/2004 | Tsujii | |
| 6,925,193 B2 | 8/2005 | Farmer | |
| 6,938,073 B1 | 8/2005 | Mendhekar | |
| 7,003,167 B2 | 2/2006 | Mukherjee | |
| 7,149,811 B2 | 12/2006 | Wise et al. | |
| 7,791,508 B2 | 9/2010 | Wegener | |
| 7,894,680 B2 | 2/2011 | Moon et al. | |
| 7,916,960 B2 | 3/2011 | Mizuno | |
| 7,965,900 B2 | 6/2011 | Maurer et al. | |
| 8,077,990 B2 | 12/2011 | Islam | |
| 8,130,828 B2 | 3/2012 | Hsu et al. | |
| 8,194,989 B2 | 6/2012 | Lee et al. | |
| 8,265,144 B2 | 9/2012 | Christoffersen | |
| 8,347,329 B2 | 1/2013 | Dawson | |
| 8,422,804 B2 | 4/2013 | Islam | |
| 8,463,033 B2 | 6/2013 | Islam | |
| 8,639,057 B1 | 1/2014 | Mendhekar | |
| 8,811,736 B2 | 8/2014 | Islam | |
| 9,042,644 B2 | 5/2015 | Mendhekar | |
| 9,230,341 B2 | 1/2016 | Islam | |
| 9,917,877 B2 | 3/2018 | Adams et al. | |
| 10,015,506 B2 | 7/2018 | Mendhekar | |
| 10,015,507 B2 | 7/2018 | Mendhekar | |
| 10,460,700 B1 | 10/2019 | Mendhekar et al. | |
| 10,462,477 B2 | 10/2019 | Mendhekar | |
| 10,482,653 B1 | 11/2019 | Xu et al. | |
| 10,595,069 B2 | 3/2020 | Swaminathan et al. | |
| 10,742,704 B2 | 8/2020 | Guardini et al. | |
| 10,743,004 B1* | 8/2020 | Waggoner | H04L 65/611 |
| 10,944,971 B1 | 3/2021 | Guardini et al. | |
| 2001/0031009 A1 | 10/2001 | Knee et al. | |
| 2001/0041011 A1 | 11/2001 | Passagio et al. | |
| 2001/0048770 A1 | 12/2001 | Maeda | |
| 2002/0108118 A1 | 8/2002 | Cohen et al. | |
| 2003/0002734 A1 | 1/2003 | Islam et al. | |
| 2003/0108099 A1* | 6/2003 | Nagumo | G06T 9/20 |
| | | | 375/E7.199 |
| 2003/0202579 A1 | 10/2003 | Lin et al. | |
| 2003/0202581 A1 | 10/2003 | Kodama | |
| 2003/0206590 A1 | 11/2003 | Krishnamachari | |
| 2004/0137886 A1 | 7/2004 | Ross et al. | |
| 2004/0264793 A1 | 12/2004 | Okubo | |
| 2005/0063599 A1 | 3/2005 | Sato | |
| 2006/0039473 A1 | 2/2006 | Filippini et al. | |
| 2006/0115166 A1 | 6/2006 | Sung et al. | |
| 2006/0177145 A1 | 8/2006 | Lee et al. | |
| 2006/0285587 A1 | 12/2006 | Luo et al. | |
| 2007/0019875 A1 | 1/2007 | Sung et al. | |
| 2007/0064800 A1 | 3/2007 | Ha | |
| 2007/0082742 A1* | 4/2007 | Takizawa | A63F 13/525 |
| | | | 463/43 |
| 2007/0113250 A1 | 5/2007 | Logan | |
| 2007/0206871 A1 | 9/2007 | Jalil et al. | |
| 2007/0237237 A1 | 10/2007 | Chang et al. | |
| 2007/0248163 A1 | 10/2007 | Zuo et al. | |
| 2008/0032739 A1 | 2/2008 | Soskov et al. | |
| 2008/0211788 A1* | 9/2008 | Ting | G09G 5/395 |
| | | | 345/204 |
| 2008/0240239 A1 | 10/2008 | Stuart | |
| 2008/0247658 A1 | 10/2008 | Lee et al. | |
| 2010/0007738 A1 | 1/2010 | Lehnert | |
| 2010/0020868 A1 | 1/2010 | Ayres, Jr. et al. | |
| 2010/0066912 A1 | 3/2010 | Kumwilaisak | |
| 2010/0110163 A1 | 5/2010 | Bruls et al. | |
| 2010/0266008 A1 | 10/2010 | Reznik | |
| 2010/0272174 A1 | 10/2010 | Toma et al. | |
| 2010/0299630 A1 | 11/2010 | McCutchen et al. | |
| 2010/0329358 A1 | 12/2010 | Zhang et al. | |
| 2011/0103445 A1 | 5/2011 | Jax et al. | |
| 2011/0200262 A1 | 8/2011 | Canel-Katz | |
| 2011/0206287 A1 | 8/2011 | Islam | |
| 2011/0307685 A1 | 12/2011 | Song | |
| 2012/0007947 A1* | 1/2012 | Costa | H04N 13/218 |
| | | | 375/240.18 |
| 2012/0026157 A1 | 2/2012 | Unkel et al. | |
| 2012/0086815 A1 | 4/2012 | Cooper et al. | |
| 2012/0120251 A1* | 5/2012 | Sun | H04N 17/00 |
| | | | 348/180 |
| 2012/0183053 A1* | 7/2012 | Lu | H04N 19/159 |
| | | | 375/240.03 |
| 2013/0024898 A1 | 1/2013 | Munetsugu et al. | |
| 2013/0072299 A1 | 3/2013 | Lee | |
| 2013/0094590 A1 | 4/2013 | Laksono et al. | |
| 2013/0286160 A1 | 10/2013 | Sasaki et al. | |
| 2013/0315573 A1 | 11/2013 | Sasaki et al. | |
| 2014/0028721 A1 | 1/2014 | Kalva | |
| 2014/0341303 A1 | 1/2014 | Mendhekar | |
| 2014/0341304 A1 | 1/2014 | Mendhekar | |
| 2014/0133583 A1 | 5/2014 | Lin et al. | |
| 2014/0188451 A1 | 7/2014 | Asahara et al. | |
| 2014/0282736 A1 | 9/2014 | Elstermann | |
| 2014/0306954 A1 | 10/2014 | Kao | |
| 2015/0055937 A1 | 2/2015 | Van Hoff et al. | |
| 2015/0229948 A1* | 8/2015 | Puri | H04N 19/117 |
| | | | 375/240.03 |
| 2015/0235453 A1 | 8/2015 | Schowengerdt et al. | |
| 2015/0264296 A1 | 9/2015 | Devaux | |
| 2015/0279022 A1 | 10/2015 | Shuster et al. | |
| 2015/0338204 A1 | 11/2015 | Richert et al. | |
| 2015/0348558 A1 | 12/2015 | Riedmiller et al. | |
| 2015/0362733 A1 | 12/2015 | Spivack | |
| 2016/0013244 A1* | 1/2016 | Sutton | H01L 27/14687 |
| | | | 438/73 |
| 2016/0073114 A1 | 3/2016 | Kawamura | |
| 2016/0140733 A1 | 5/2016 | Gu et al. | |
| 2016/0150230 A1* | 5/2016 | He | H04N 19/124 |
| | | | 375/240.03 |
| 2016/0198140 A1 | 7/2016 | Nadler | |
| 2016/0247250 A1 | 8/2016 | Mendhekar | |
| 2016/0282433 A1* | 9/2016 | Kannengiesser | G01R 33/4828 |
| 2016/0307297 A1* | 10/2016 | Akenine-Moller | G06F 3/011 |
| 2017/0034501 A1* | 2/2017 | McDevitt | G06T 3/04 |
| 2017/0064294 A1* | 3/2017 | Priede | G06T 15/20 |
| 2017/0103577 A1 | 4/2017 | Mendhekar et al. | |
| 2017/0188007 A1 | 6/2017 | Bae et al. | |
| 2017/0206707 A1* | 7/2017 | Guay | H03M 7/30 |
| 2017/0244775 A1* | 8/2017 | Ha | G06T 1/20 |
| 2017/0302918 A1 | 10/2017 | Mammou et al. | |
| 2018/0035134 A1 | 2/2018 | Pang et al. | |
| 2018/0077209 A1 | 3/2018 | So et al. | |
| 2018/0160160 A1 | 6/2018 | Swaminathan | H04N 21/816 |
| 2018/0192058 A1 | 7/2018 | Chen et al. | |
| 2018/0232955 A1 | 8/2018 | Namgoong et al. | |
| 2018/0262687 A1 | 9/2018 | Hildreth | |
| 2018/0270471 A1 | 9/2018 | Luo et al. | |
| 2018/0300564 A1* | 10/2018 | Kwant | G06V 10/50 |
| 2018/0310013 A1* | 10/2018 | Tanner | H04N 19/53 |
| 2019/0012822 A1 | 1/2019 | Seigneurbieux | |
| 2019/0045222 A1* | 2/2019 | Yip | H04N 19/31 |
| 2019/0051058 A1* | 2/2019 | Robinson | G06F 3/00 |
| 2019/0102944 A1 | 4/2019 | Han et al. | |
| 2019/0113966 A1 | 4/2019 | Connellan et al. | |
| 2019/0173929 A1 | 6/2019 | Guardini et al. | |
| 2019/0174125 A1 | 6/2019 | Ninan | |
| 2019/0200084 A1 | 6/2019 | Gilson et al. | |
| 2019/0258058 A1* | 8/2019 | Fortin-Deschêes | |
| | | | G06T 19/006 |
| 2019/0310472 A1 | 10/2019 | Schilt et al. | |
| 2019/0362151 A1 | 11/2019 | Stokking et al. | |
| 2019/0364204 A1 | 11/2019 | Wozniak et al. | |

(56) References Cited

U.S. PATENT DOCUMENTS

2019/0364205 A1 11/2019 Wozniak et al.
2020/0050884 A1 2/2020 Han et al.
2020/0152105 A1* 5/2020 Ishii .................. G02B 27/0172

FOREIGN PATENT DOCUMENTS

WO WO2003/103295 12/2003
WO WO 2006/061734 6/2006

OTHER PUBLICATIONS

Anonymous, entitled "Roads & Cones" - retreated from the web on May 7, 2018 at https://www.cis.rit.edu/people/faculty/montag/vandplite/pages/chap_9/ch9p1.html (8 pgs.).

Charalampos Patrikakis, Nikolaos Papaoulakis, Panagiotis Papageorgiou, Aristodemos Pnevmatikakis, Paul Chippendale, Mario S. Nunes, Rui Santos Cruz, Stefan Poslad, Zhenchen Wang, "Personalized Coverage of Large Athletic Events", Nov. 9, 2010, IEEE, IEEE MultiMedia, vol. 18, issue 4.

Omar A. Niamut, Axel Kochale, Javier Ruiz Hidalgo, Rene Kaiser, Jens Spille, Jean-Francois Macq, Gert Kienast, Oliver Schreer, Ben Shirley, "Towards A Format-agnostic Approach for Production, Delivery and Rendering of Immersive Media", Mar. 1, 2013, ACM, Proceedings of the 4th ACM Multimedia Systems Conference.

Rene Kaiser, Marcus Thaler, Andreas Kriechbaum, Hannes Fassold, Werner Bailer, Jakub Rosner, "Real-time Person Tracking in High-resolution Panoramic Video for Automated Broadcast Production", Nov. 17, 2011, IEEE, 2011 Conference for Visual Media Production, pp. 21-29.

* cited by examiner

FIGURE 1

| Properties of Rod and Cone Systems |||
|---|---|---|
| Rods | Cones | Comment |
| More photopigment | Less photopigment | |
| Slow response: long integration time | Fast response: short integration time | Temporal integration |
| High amplification | Less amplification | Single quantum detection in rods (Hecht, Schlaer & Pirenne) |
| Saturating Response (by 6% bleached) | Non-saturating response (except S-cones) | The rods response saturates when only a small amount of the pigment is bleached (the absorption of a photon by a pigment molecule is known as bleaching the pigment). |
| Not directionally selective | Directionally selective | Stilies-Crawford effect (see later this chapter) |
| Highly convergent retinal pathways | Less convergent retinal pathways | Spatial integration |
| High sensitivity | Lower absolute sensitivity | |
| Low acuity | High acuity | Results from degree of spatial integration |
| Achromatic: one type of pigment | Chromatic: three types of pigment | Color vision results from comparisons between cone responses |

VIDEO QUALITY IMPROVEMENTS SYSTEM AND METHOD FOR VIRTUAL REALITY

PRIORITY CLAIMS/RELATED APPLICATIONS

This application claims the benefit under 35 USC 119 (e) to U.S. Provisional Patent Application Ser. No. 62/503,560, file May 9, 2017 and entitled "Video Quality Improvements System and Method for Virtual Reality", the entirely of which is incorporated herein by reference.

FIELD

The disclosure relates generally to a virtual reality system and the video associated with virtual reality.

BACKGROUND

Virtual Reality brings new challenges when it comes to Video Compression where the content (that is uncompressed video) is enjoyed within a Head Mounted Display so that the video is only a few inches away from the eye of the user. Because the video is very close to the eye and the eye is sensitive to artifacts that occur during video compression the user is more likely to see the artifacts and impairments in the video that used to be unnoticeable to the user when watching a few feet away from a TV set.

Figure 1:
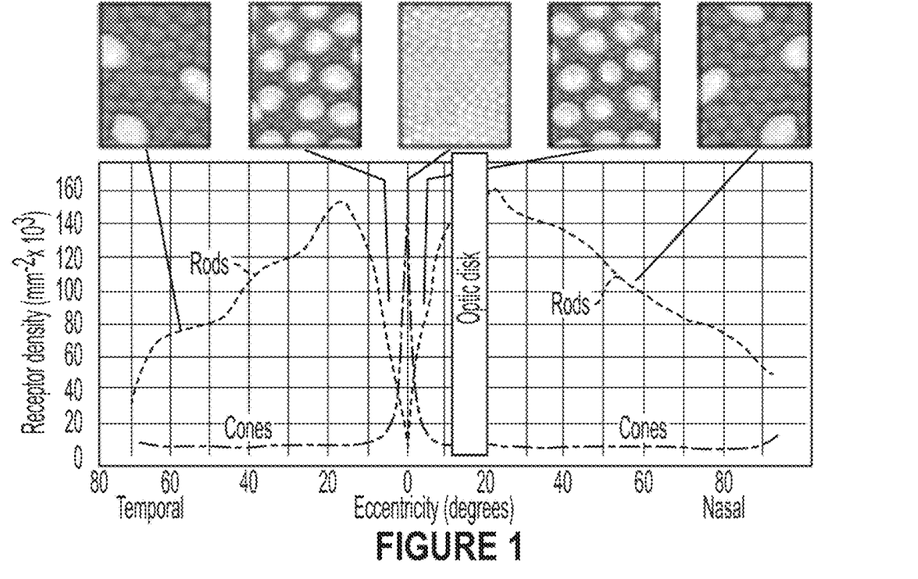
FIG. 1 is a graph showing the visual acuity of a human being.
Figure 2:
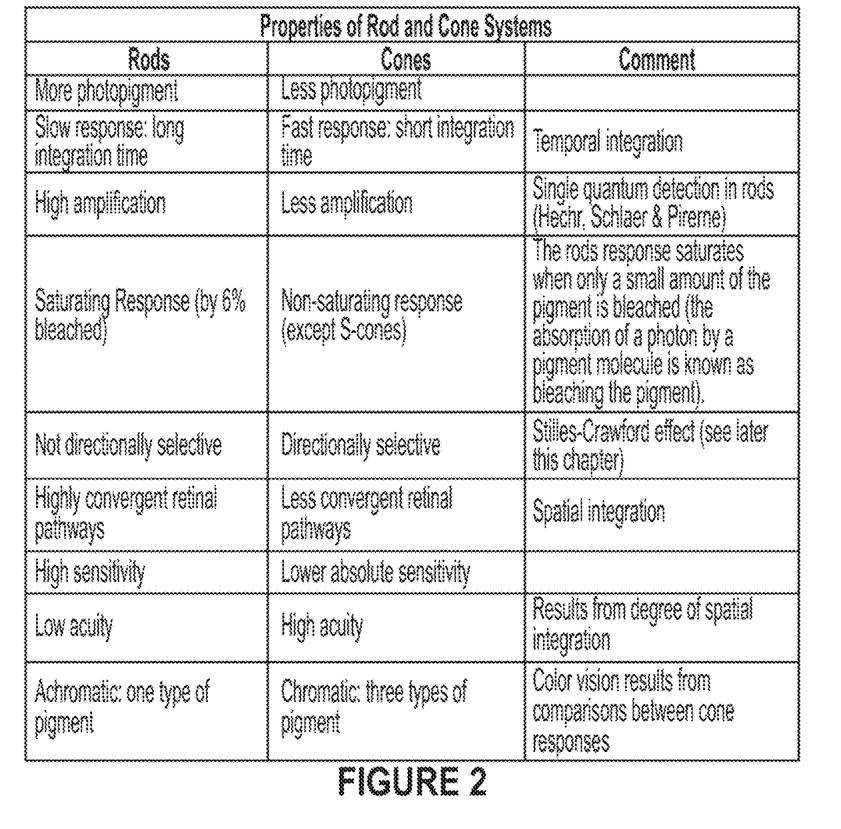
FIG. 2 is a chart of the properties of rods and cones of a human eye.

Extensive research has been conducted on the visual acuity of a human being. That research reveals that a human being has better visual acuity at a center of their vision than at the edges of their vision. More specifically, the visual acuity of the human eye centers on the middle 10° of horizontal view (±5°) due to the high density of Cones on the retina (green line in the graph in FIG. 1). At ±5° from center, the Cone density is 50% of the center spot. The Cones, in contrast to the Rods, have a higher visual acuity and a faster response as shown in FIG. 2 that shows the properties of the rods and cones in a human eye. Further details about the graph in FIG. 1 may be found at Purves D, Augustine G J, Fitzpatrick D, et al., editors. Neuroscience. 2nd edition. Sunderland (MA): Sinauer Associates; 2001. Anatomical Distribution of Rods and Cones. Available from: https://www.ncbi.nlm.nih.gov/books/NBK10848/ that is incorporated herein by reference. Further details of the chart of the properties of rods and cones may be found at https://www.cis.rit.edu/people/faculty/montag/vandplite/pages/chap_9/ch9p1.html that is incorporated herein by reference. Given the above known properties of a human eye, those properties can be leveraged to improve the video quality.

The technical problem with existing virtual reality systems and methods is that these systems and method use existing video compression techniques that provide acceptable quality when used to compress television signals. However, these existing techniques do not provide the level of video quality needed for virtual reality systems for the reasons described above. Thus, it is desirable to improve the quality of the video used for virtual reality systems.

DETAILED DESCRIPTION OF ONE OR MORE EMBODIMENTS

The disclosure is particularly applicable to a streaming virtual reality system that has a client/server type architecture and it is in this context that the disclosure will be described. It will be appreciated, however, that the system and method for improved video quality has greater utility since it may be used with other streaming virtual reality systems that may utilize a different architecture (peer to peer, single computer, mainframe computer, etc.) and also may be used with other systems in which it is desirable to be able to generate improved video quality to be displayed to a user.

Figure 3:
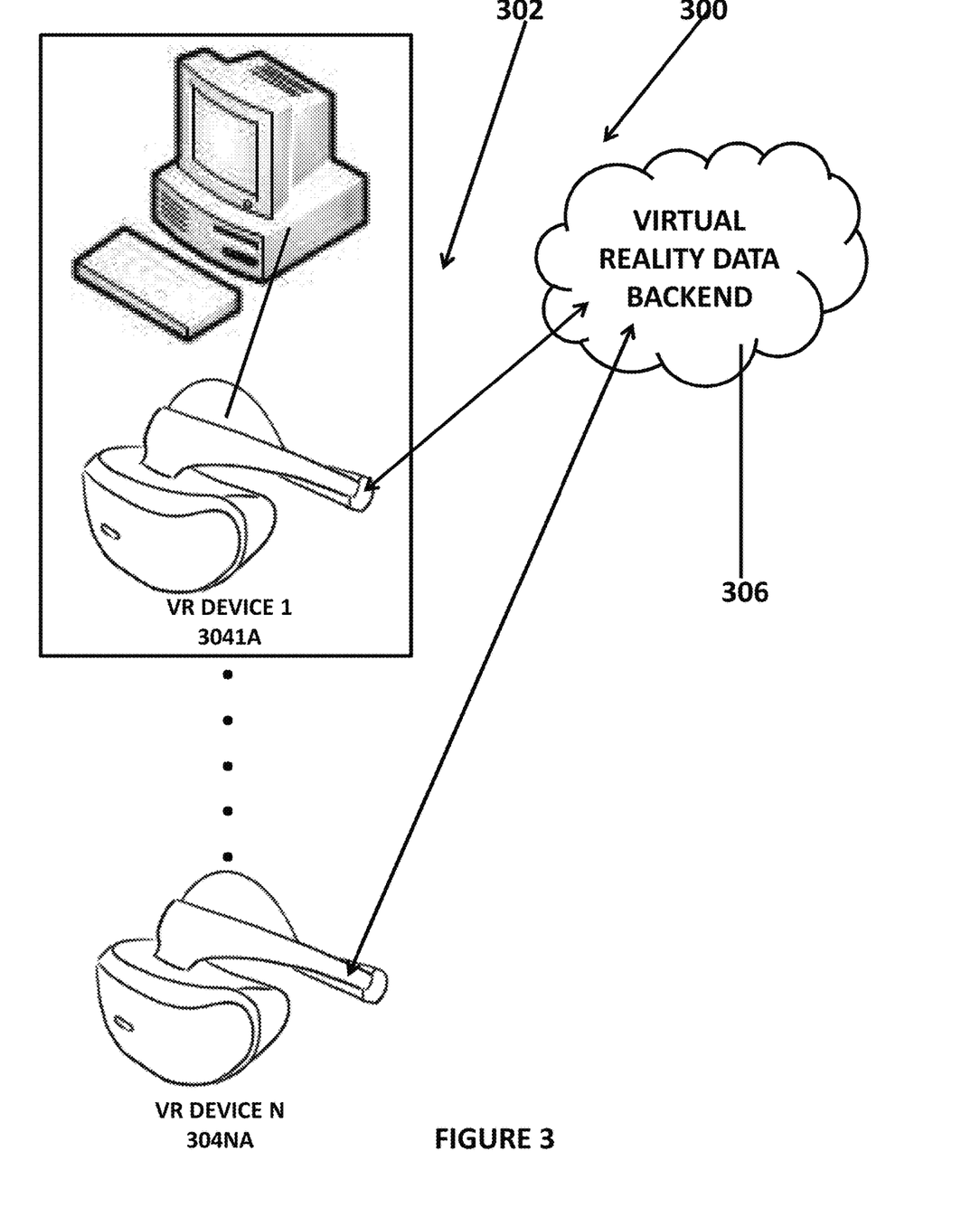
FIG. 3 is an example of a streaming virtual reality system that can benefit from improved video quality.

FIG. 3 illustrates a virtual reality system 300 having a plurality of virtual reality devices 302 and a virtual reality data backend 306 that are coupled together by a communications path. The communication path between each virtual reality device 302 and the backend 306 may be a wired or wireless network, a cellular data network, a wireless computer data network, an Ethernet or optical data connection and the like. The communications path between each virtual reality device 302 and the backend 306 may be different (or have different components) and thus the communications path between each virtual reality device 302 and the backend 306 may each have different network latency.

In a streaming system as shown in FIG. 3, the backend 306 may receive data from each virtual reality device (including positioning/orientation data for the virtual reality device and/or network congestion data) and may generate optimized virtual reality data for each virtual reality data based on the data from each virtual reality device. The optimized virtual reality data may be optimized for each virtual reality device and may address video quality issues with streaming virtual reality devices and systems by adjusting quantization parameters, gradient scaling and/or different fields of view as described in more detail below. It is noted that the video quality improvements disclosed below also may be implemented in other virtual reality systems (that for example may not stream the virtual reality data) and the streaming virtual reality system shown in FIG. 3 is just illustrative since the system and method may be used with any system in which it would be desirable to improve the quality of the video.

Each virtual reality device 302 may be a device that is capable of receiving virtual reality streaming data, processing the virtual reality streaming data (including possibly decompressing that data) and displaying the virtual reality streaming data to a user using some type of virtual reality viewing device. Each virtual reality device may further directly deliver an immersive visual experience to the eyes of the user based on positional sensors of the virtual reality device that detects the position of the virtual reality device and affects the virtual reality data being displayed to the user. Each virtual reality device 302 may include at least a processor, memory, one or more sensors for detecting and generating data about a current position/orientation of the virtual reality device 302, such as an accelerometer, etc., and a display for displaying the virtual reality streaming data. For example, each virtual reality device 302 may be a virtual reality Headset, a computer having an attached virtual reality headset, a mobile phone with virtual reality viewing accessory or any other plain display device capable of displaying video or images. For example, each virtual reality device 302 may be a computing device, such as a smartphone, personal computer, laptop computer, tablet computer, etc. that has an attached virtual reality headset 304A1, or may be a self-contained virtual reality headset 304AN.

The system 300 may further comprise the backend 306 that may be implemented using computing resources, such as a server computer, a computer system, a processor, memory, a blade server, a database server, an application server and/or various cloud computing resources. The backend 306 may be implemented using a plurality of lines of computer code/instructions that may be stored in a memory of the computing resource and executed by a processor of the computing resource so that the computer system with the processor and memory is configured to perform the functions and operations of the system as described below. The backend 306 may also be implemented as a piece of hardware that has processing capabilities within the piece of hardware that perform the backend virtual reality data functions and operations described below. Generally, the backend 306 may receive a request for streamed virtual reality data for a virtual reality device (that may contain data about the virtual reality device) and perform the technical task of virtual reality data preparation (using one or more rules or lines of instructions/computer code). The VR data preparation may include generating the stream of known in view and out of view virtual reality data as well as the one or more pieces of optimized virtual reality data (collectively the "optimized streamed virtual reality data" that includes improved content quality) based on each request for streamed virtual reality data for each virtual reality device 302. The backend 306 may then stream that optimized streamed virtual reality data to each virtual reality device 302 that requested the virtual reality data. The optimized streamed virtual reality data is used to solve the technical problems of poor and noticeable VR data quality in VR systems as described above.

Figure 4:
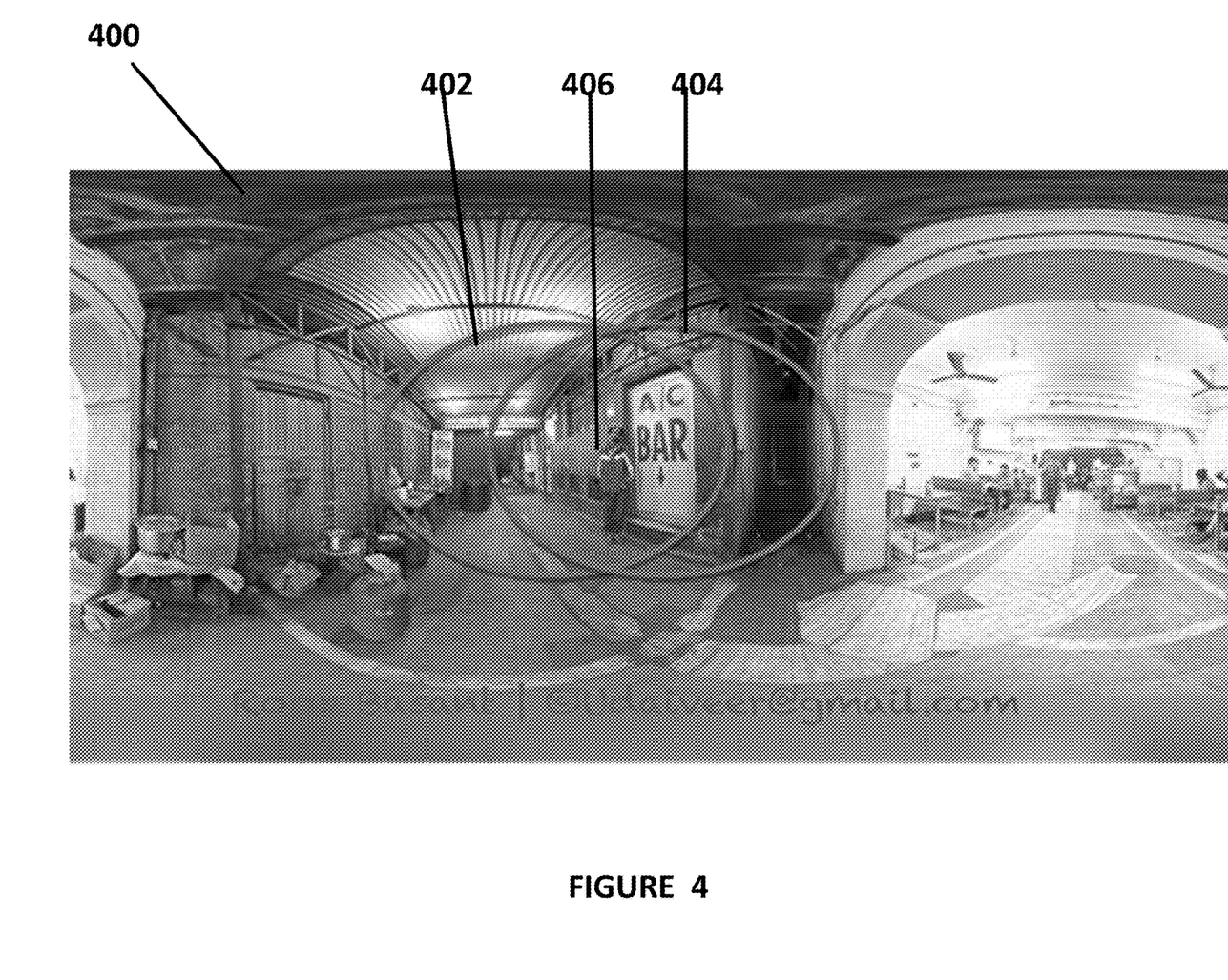
FIG. 4 illustrates an example of the views from each eye of the head mounted display of the virtual reality system and the viewport of the virtual reality system.

FIG. 4 illustrates an example of a frame of virtual reality data 400, a view of each eye of the virtual reality device 402, 404 and a viewport 406 (also known as an "in-view portion" or "field of view"). In a typical virtual reality streaming system, the virtual reality data may be a plurality of frames of virtual reality data that may be compressed using various compression processes such as MPEG or H.264 or H.265. For purposes of illustration, only a single frame is shown in FIG. 4, although it is understood that the processes described below may be performed on each frame of virtual reality streaming data. In a virtual reality streaming data system, a viewer/user typically views this frame of virtual data (that is part of the virtual reality data video or virtual reality streamed data) using the virtual reality device 302 that plays back only a section of the whole frame/video based on the direction in which the virtual reality device 302 is positioned by the user who is wearing the device that may be determined by the sensors/elements of the device 302. As shown in FIG. 4, based on the direction/position of the virtual reality device, a certain portion of the frame, such as a left eye view portion 402 and a right eye portion 404 may be within the view of the user of the virtual reality device 302. For example, the virtual reality device may provide a viewport that has the left eye view portion 402, the right eye view portion 404 as shown by the overlapping ovals shown in FIG. 4 and a central region 406 (the field of view) that is displayed to both eyes of the user similar to how a human being's eyes operate so that the virtual reality system provides an immersive experience for the user. Depending upon the configuration of the virtual reality device, the field of view of the virtual reality device determines the specific portion of the frame that needs to be displayed to each eye of the user. As an example, a virtual reality device with a 90-degree horizontal and vertical field of view, will only display about $\frac{1}{4}^{th}$ of the frame in the horizontal direction and ½ of the frame in the vertical direction.

Figure 5:
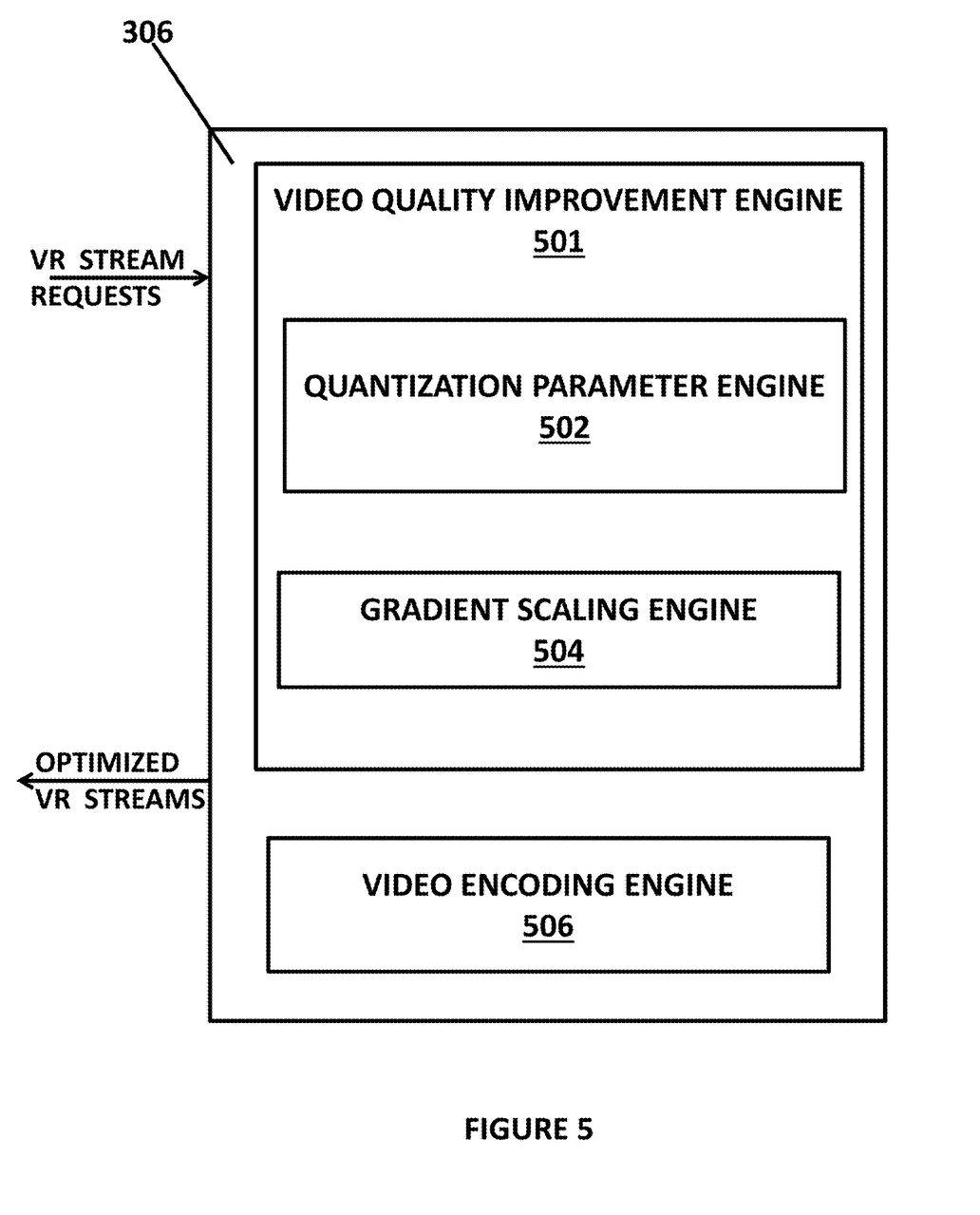
FIG. 5 illustrates more details of the virtual reality backend that is part of the streaming virtual reality system.

FIG. 5 illustrates more details of the virtual reality backend 306 that is part of the streaming virtual reality system. The virtual reality data backend 306 may be known as a virtual reality streaming data compression component/module/system that reduces the overall amount of virtual reality data (and hence reduces the bandwidth required for the virtual reality data) that has to be streamed to each virtual reality device 302 shown in FIG. 1 while improving the virtual reality data quality. The virtual reality data backend 306 may receive a virtual reality (VR) data stream request from each virtual reality device 302 (that may include data about that virtual reality device as described above) and may generate an optimized VR stream (including improved quality virtual reality data) that is sent back to each virtual reality device 302. Each optimized VR stream for each virtual reality device may include the in-view and out-of-view data and one or more pieces of optimized virtual reality data. The one or more pieces of optimized virtual reality data may include adjusted quantization parameters for the field of view, gradient scaling for the field of view and/or adjustable size/shape fields of view as described below that improves the quality of the virtual reality data that is streamed to each virtual reality device 302.

The backend system 306 may further include a video quality improvement engine 501 and a video encoding engine 506 that implements one or more different methods/processes that improve the quality of the virtual reality data to provide a technical solution to the above described problem of conventional virtual reality systems. The video quality improvement engine 501 and the video encoding engine 506 each may be implemented using a plurality of lines of computer code/instructions as described above or using hardware device as described above. The video quality improvement engine 501 may further include a quantization parameter engine 502 and a gradient scaling engine 504 that may be coupled to each other. Each of these modules/components/engines 502-506 may be implemented in hardware or software. If a module/component/engine is implemented in software, the module/component/engine comprises a plurality of lines of computer code/instructions that may be executed by a processor of the backend system that perform a set of instructions/rules that perform the function and operation of that module as described below. If a component/module/engine is implemented in hardware, the module may be a piece of hardware, such as a microcontroller, processor, programmed logic device, etc. that is programmed/manufactured so that the module performs the function and operation of that module as described below. The important aspects of these modules is the operations/processes that these modules perform to improve the quality of the virtual reality data and the particular implementation of the modules using well known computer elements like a processor, server computer, etc. is not important to the disclosure or affect the important aspect of the system.

The quantization parameter engine 502 may execute a process/method using an algorithm to adjust the quantization parameters of the virtual reality data sent to each device 302. An example of the processes performed by the quantization parameter engine 502 is described in more detail with respect to FIGS. 6-7. The gradient scaling engine 504 may execute a process/method using an algorithm to perform gradient scaling of the virtual reality data sent to each device 302. An example of the processes performed by the quantization parameter engine 502 is described in more detail with respect to FIGS. 8-9. The video encoding engine 506 may execute a process/method using an algorithm to adjust the field of view shapes of the virtual reality data sent to each device 302. An example of the processes performed by the quantization parameter engine 502 is described in more detail with respect to FIGS. 10-11. The video encoding engine 506 may also perform other processes such as compression and/or encryption, etc. to encode the virtual reality data to be sent back to each device 302.

Figure 6:
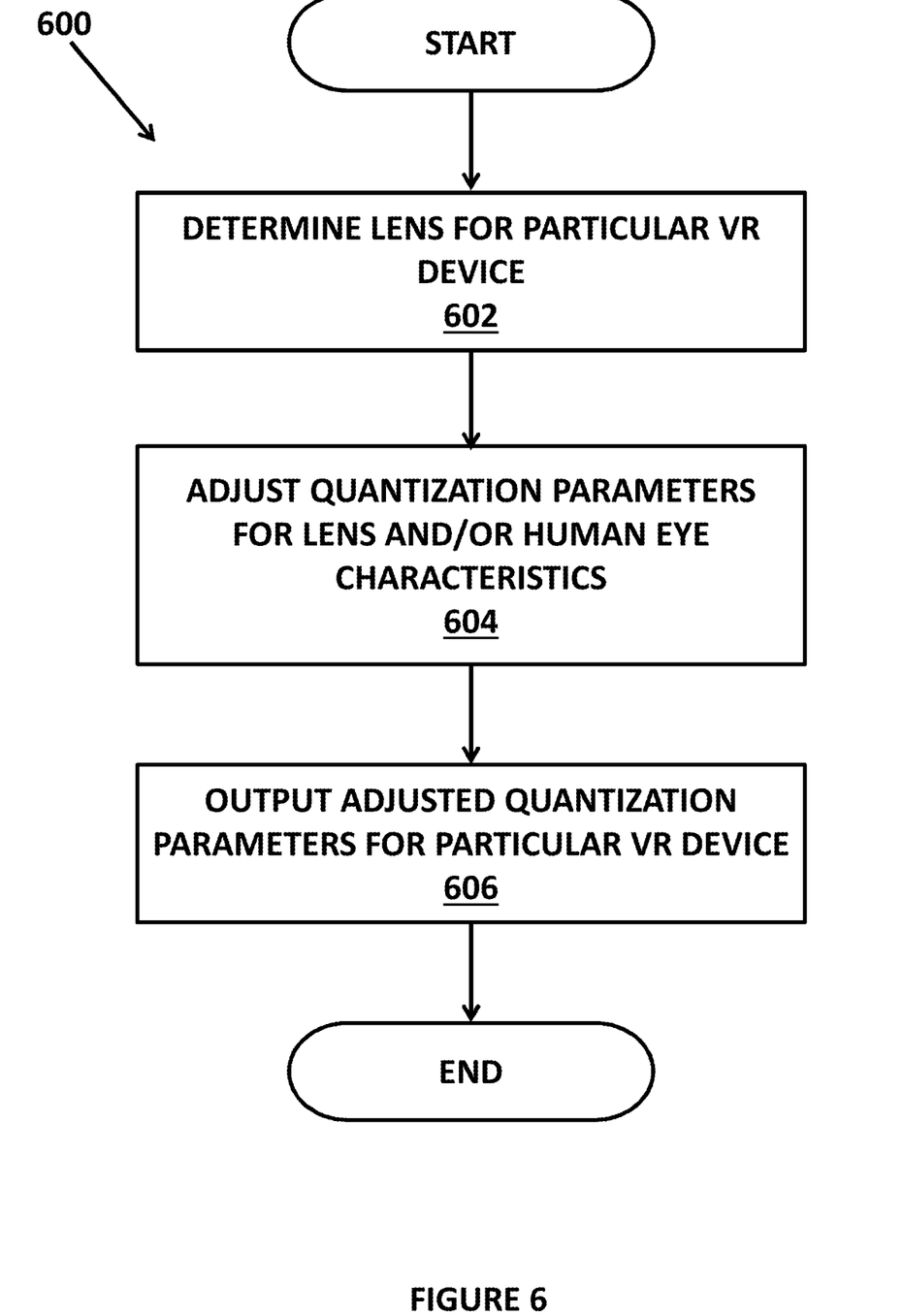
FIG. 6 illustrates a method for adjusting quantization parameters that improves video quality.

FIG. 6 illustrates a method 600 for adjusting quantization parameters that improves video quality for each virtual reality data request from each device 302. The method shown in FIG. 6 may be implemented by the system shown in FIGS. 3 and 5, but may also be implemented in other known manners. Quantization parameters are well known parameters used in various lossy compression schemes that reduce the amount of data in the compressed data. In some lossy compression schemes, the quantization parameters may be stored in a matrix and then applied to blocks of pixels that are part of the virtual reality data. The method may determine characteristics of the lens of the head mounted display lens of the device 302 (602). In some embodiments, the method may store the characteristics of the various different types of head mounted display lens and retrieve those characteristics. In other embodiments, the method may determine those lens characteristics using other means since different lenses may have different characteristics and thus different shapes for mapping. The mapping can also be modified based on what is less noticeable by the user. For example, an elliptical shape seems to be the most appropriate. The characteristics of the lens may include lens distortion and lens shape.

As described above, the characteristics of a human eye (the rods and cones) are known and this method also leverages those known characteristics of the human eye. Thus, the method may then, based on the lens characteristics and the human eye characteristics, adjust the quantization parameters (604) in the spatial domain to improve the quality of the virtual reality data sent to each device 302. The method may then output the adjusted quantization parameters for each device 302 (606).

The adjusted quantization parameters take into account the impact of the lenses. Specifically, due to lens distortion, the quality as seen by the eye is optimal in the center where the majority of the users are looking, but then degrades the further away from the center the user looks. Thus, the adjusted quantization parameters take advantage of this characteristic and apply a QP (Quantization Parameter) map (a matrix that contains the adjusted quantization parameters for the different regions of the virtual reality data (see FIG. 7 for example) matching the lens shape.

Figure 7:
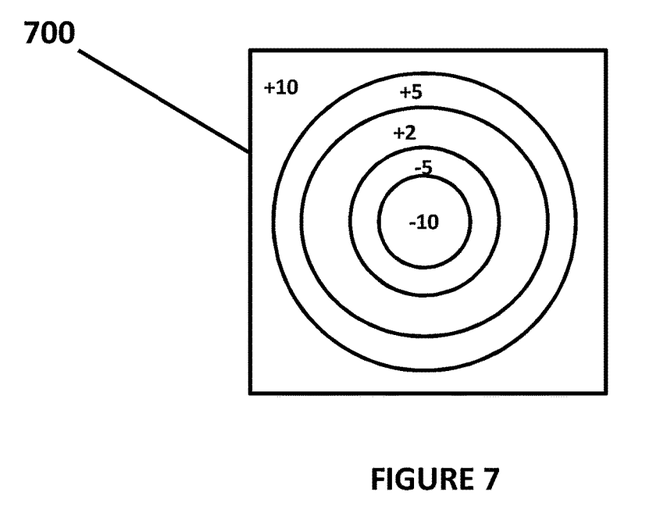
FIG. 7 illustrates an example of a field of view with adjusted quantization parameters.

The adjusted quantization parameters also take into account the impact of the rod and cone density of the human retina. The cones of the retina provide the eye with high visual acuity and fast response (10 ms integration time). These cones are highly concentrated in the middle 10° of human vision. The rods which have less acuity and a slower response time (100 ms integration time) peak at ±30° from center and fall off toward zero at ±140° from center. Thus, the method may provide a QP map that matches these human eye characteristics.

FIG. 7 illustrates an example of a field of view 700 with adjusted quantization parameters for a particular device 302 having particular lens characteristics. The quantization parameters (QP) define the scale of the quantization being applied to the data. For example, a big value for a QP means that there will be fewer values to choose from, making the compression more efficient. However, in the center, the trick is to decrease the QP to generate more samples etc. Thus, as shown in the example in FIG. 7, the center most portion of the field of view has a −10 quantization parameter so that the central portion is less compressed so that the virtual reality data has a better quality in the center portion. Then, as shown in FIG. 7, as the data is farther away from the center, its quantization parameters is adjusted so that more compression occurs resulting in less quality in areas in which the human is less aware of the quality due to the lens characteristics and the human eye characteristics.

Figure 8:
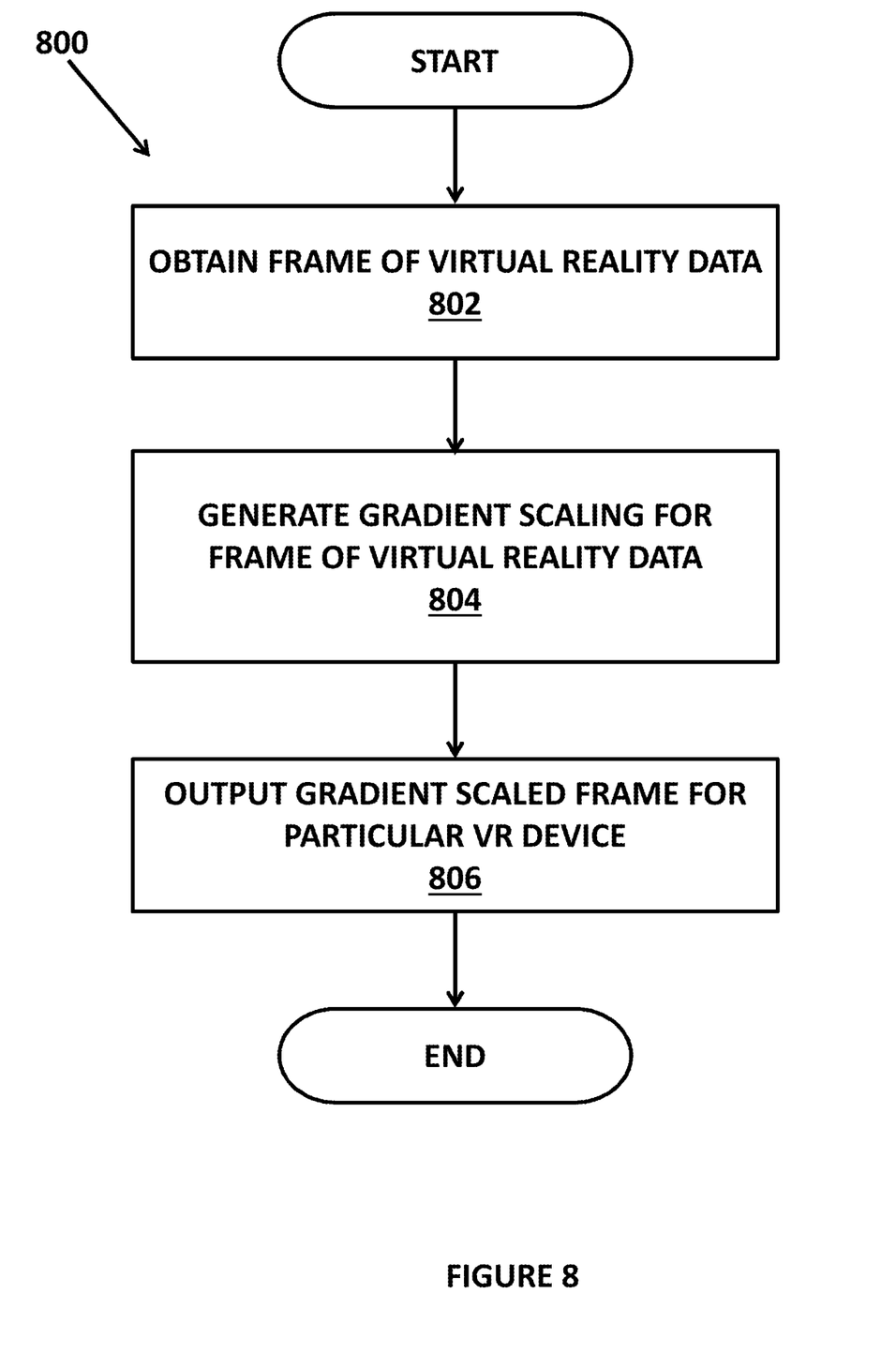
FIG. 8 illustrates a method for gradient scaling that improves video quality.

FIG. 8 illustrates a method 800 for gradient scaling that improves video quality for each virtual reality data request from each device 302. The method may be performed on each frame of virtual reality data. The method shown in FIG. 8 may be implemented by the system shown in FIGS. 3 and 5, but may also be implemented in other known manners. Gradient scaling is a technique that improves quality in a center portion of the frame (field of view) while reducing the quality (and reducing the number of bits used to encode) portions farther away from the center to thus have perceived improved image quality due to the characteristics of the human eye. By scaling the frame per eye in a gradient manner (more scaling when moving away from the center), the amount of pixels to encode is thus reduced by a significant factor, allowing a more efficient encoding. At the decoding side, the reverse scaling is applied by the device 302 to recover the original image per eye.

Figure 9A:
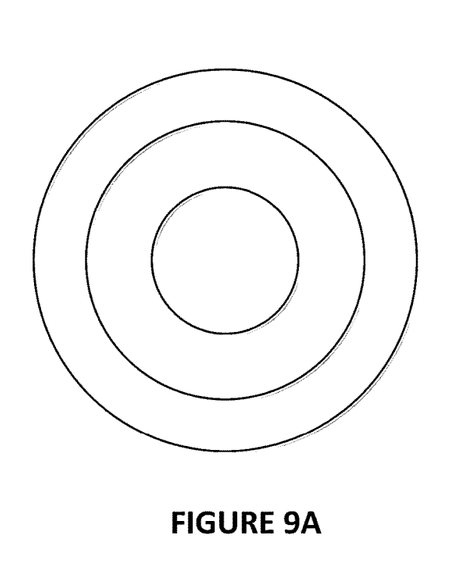
FIGS. 9A and 9B illustrate an example of gradient scaling of a field of view.
Figure 9B:
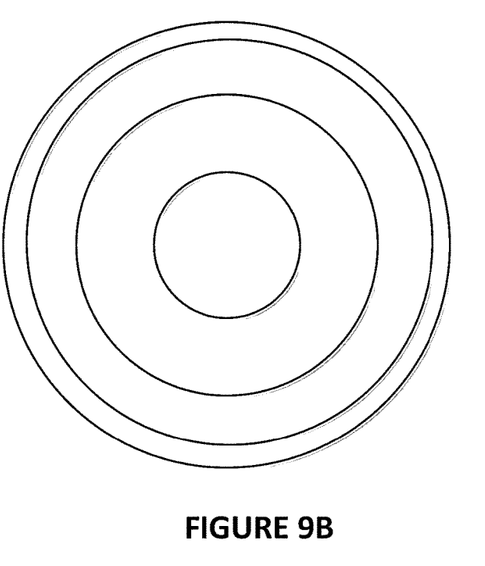

The method may obtain a frame of virtual reality data (802) and may generate the gradient scaling for the frame (804). In the method, gradient Scaling is applied beyond the actual Field of View (FOV). Specifically, the method implements gradient scaling to encode the original full 360 degree video frame for a specific view point and use gradient scaling from the center where the user is currently looking all the way to the edge of the current 360 degree view (an example of which is shown in FIGS. 9A and 9B in which FIG. 9A shows the FOV with no gradient since the circles are concentric while FIG. 9B shows the circles getting closer together towards the end of the FOV illustrating the gradient scaling), by applying a progressive gradient. This results in encoding the FOV with many bits (the original pixel ratio of the original virtual reality data), while what used to be a separate out of view (OOV) is now converted into a bigger FOV, but with less quality as the end result pixel density is very poor on the edge (a decreased pixel density/ratio at the edge or in the OOV portion of the virtual reality data). For example, an original 4096×2048 video frame could be encoded into a 1280×1280 video frame per eye, while including a 1 to 1 match in pixels for the 1080×1080 pixels mapping to the 90 degrees FOV, while using the rest of the pixels (200 horizontal and 200 vertical) to encode the rest of the 360 view in a gradient scaling manner. The gradient scaled frame may be communicated back to the particular device 302.

For an adaptive streaming virtual system, the gradient scaling method may provide a new level of flexibility to adaptive streaming solutions. Legacy adaptive streaming systems only have variations between different video profiles that include the resolution, frame rate, and bitrate. Using the gradient method described above, the method may use multiple FOVs to cover the full 360 original video so that different gradient scaling sizes per bitrate range may be used. For example, for the premium profile at high bitrate, the method may use less FOVs to cover the 360 original video as we can afford to spend more bits and more pixels, while we will use a lot more FOVs when going down in bitrates where we need to use less bits and less pixels.

Figure 10:
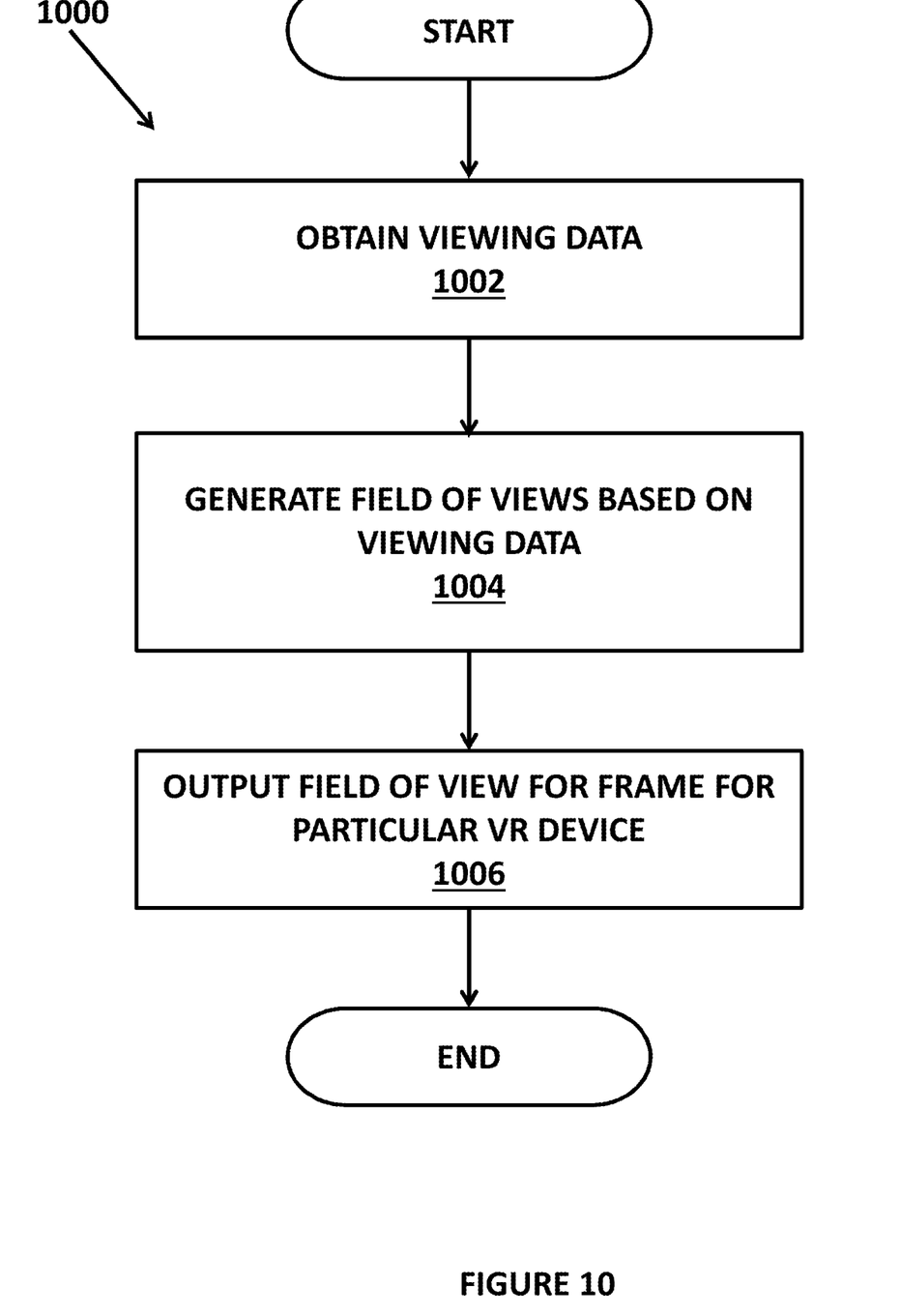
FIG. 10 illustrates a method for adaptively shaping the field of view that improves video quality.
Figure 11:
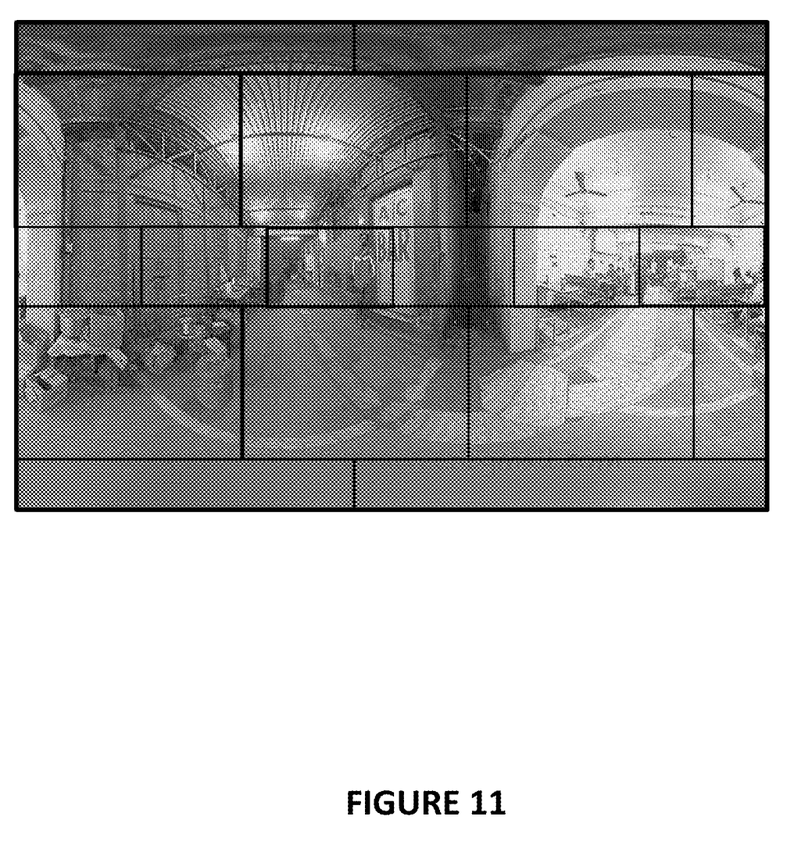
FIG. 11 illustrates an example of a frame virtual reality data overlaid by different field of views depending on the part of the frame that is within the field of view.

FIG. 10 illustrates a method 1000 for adaptively shaping the field of view that improves video quality for each virtual reality data request from each device 302. The method may be performed on each frame of virtual reality data for each device 302. The method shown in FIG. 10 may be implemented by the system shown in FIGS. 3 and 5, but may also be implemented in other known manners. In virtual reality data, each frame may have a field of view (FOV) for a particular device 302 based on the positioning of the device 302 by the user. In the method, viewing data may be gathered (1002) in which the viewing data may include analytics from the device 302 and/or backend 306 to better re-encode video on demand (VOD) content over time (such as over a period of a month, a week or a day) based on the most viewed scenes, heat maps of the content, and based on the HMD movements mostly seen when viewing the content. These analytics are used to determine which areas of the video are most seen such that they can be re-encoded with better quality, while lowering the quality of other areas of the video that are not being watched as much. Thus, for example, the method may use more bits (higher quality) to encode a scene that is most often being viewed by the users and fewer bits (lower quality) to encode the scenes of the virtual reality data that are not most often being viewed. The method may then generate a plurality of FOVs (1004) for the frame (an example of which is shown in FIG. 11) and those field of views may be sent to the particular device 302 (1006). Note that the field of views may be different sizes and shapes based on the viewing data as described above. In some embodiments, the method 1000 may adapt the number of FOVs generated based on a bitrate budget for the particular virtual reality device or system. For example, the method 1000 may generate one FOV with a high bitrate covering the full content, or many FOVs with lower bitrates covering less of the content per FOV.

In some embodiments, the discloseed method provides a method for encoding of virtual reality data in which a gradient scaling is performed for each piece of virtual reality content that has a field of view portion and an out of view portion that surrounds the field of view portion. The disclosed gradient scaling maintains a pixel ratio in the field of view portion during encoding while decreasing the pixel ratio in the out of view portion during the encoding. In the method, the virtual reality data is encoded into a smaller image using the gradient scaled pieces of virtual reality data content. The method may also gradually decrease the pixel ratio as a portion of the out of view portion is farther away from the field of view portion.

In another aspect of the disclosed method for encoding of virtual reality data, the method may generate one or more field of views for a piece of virtual reality data based on a bitrate budget for the virtual reality system and then encode the virtual reality data using the one or more generated field of views. The method also may generate a single field of view with a high bitrate covering the piece of virtual reality data and generate a plurality of field of views with a lower bitrate, each field of view of the plurality of field of views covering less of the virtual reality data.

In another aspect of the disclosed method for encoding of virtual reality data, the method may receive viewing data from a plurality of virtual reality devices wherein the viewing data indicates a content being viewed using the plurality of virtual reality devices. The method may then encode, at a backend remote from the plurality of virtual reality devices, the virtual reality data using the received viewing data. The viewing data may be viewing data over a period of time or the viewing data may be analytic data that is one of a most viewed scene of the virtual reality data, a heat map of the virtual reality data and a movement of each virtual reality device indicating a scene of the virtual reality data currently being viewed by each virtual reality device to determine an area of the scene in the virtual reality data most viewed. The method may the area of the scene in the virtual reality data most viewed at a higher quality based on the analytic data and encoding a plurality of scenes in the virtual reality data that are not most viewed at a lower quality.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, micro-controllers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising." and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method for improved virtual reality data sent to a virtual reality device, comprising:
receiving a virtual reality data request from a virtual reality device, the virtual reality data request including viewing data for the virtual reality device that issued the virtual reality data request;
generating, at a virtual reality backend remote from the virtual reality device, a gradient scaling for each frame of the virtual reality data that is a 360 degree view for a view point of a user, wherein the gradient scaling gradually decreases a pixel-scaling ratio across each frame of virtual reality data, wherein the pixel-scaling ratio is a ratio of a number of pixels in a portion of the frame before scaling to a number of pixels in the portion of the frame after scaling and wherein the gradual decrease in the pixel-scaling ratio monotonically decreases from a 1:1 pixel-scaling ratio at the center of the frame to a reduced pixel-scaling ratio at an edge of the frame of the virtual reality data and the pixel-scaling ratios are the same for concentric locations in the frame;
generating one or more fields of views for each frame of the virtual reality data based on the viewing data for the virtual reality device;
encoding the virtual reality data for the virtual reality device based on the gradient scaling and the one or more generated field of views; and
communicating the encoded virtual reality data to the virtual reality device.

2. The method of claim 1 further comprising adjusting, at the virtual reality backend remote from the virtual reality device, a set of quantization parameters that form a quantization parameter map that are used to encode the virtual reality data sent back to the virtual reality device using more bits at a center of a field of view of the virtual reality data for the particular virtual reality device and fewer bits at locations away from the center of the field of view, wherein adjusting the set of quantization parameters further comprises determining a characteristic of a lens of the virtual reality device and adjusting the set of quantization parameters based on the characteristic of the lens of the virtual reality device.

3. The method of claim 2, wherein adjusting the set of quantization parameters further comprises adjusting the set of quantization parameters based on the characteristic of the lens of the virtual reality device and a characteristics of the human eye.

4. The method of claim 3, wherein adjusting the set of quantization parameters further comprises generating a quantization parameter map.

5. The method of claim 1, wherein generating the one or more field of views further comprises generating one or more field of views having one of different sizes and different shapes.

6. The method of claim 1, wherein generating the one or more field of views further comprises generating the one or more field of views using viewing data over a period of time.

7. The method of claim 6, wherein the viewing data further comprises analytic data that is one of a most viewed scene of the virtual reality data, a heat map of the virtual reality data and a movement of each virtual reality device indicating a scene of the virtual reality data currently being viewed by each virtual reality device to determine an area of the scene in the virtual reality data most viewed and wherein encoding the virtual reality data further comprises encoding the area of the scene in the virtual reality data most viewed at a higher quality based on the analytic data and encoding a plurality of scenes in the virtual reality data that are not most viewed at a lower quality.

8. A virtual reality system, comprising:
a plurality of virtual reality devices wherein each virtual reality device has a display that displays virtual reality data to a user;
a virtual reality backend coupled to each virtual reality device;
each virtual reality device sending a virtual reality data request to the virtual reality backend, the virtual reality data request including viewing data for the virtual reality device that issued the virtual reality data request;
the virtual reality backend having a processor, a memory and a plurality of lines of computer code so that the virtual reality backend is configured to:
generate a gradient scaling for each frame of the virtual reality data that is a 360 degree view for a view point of a user, wherein the gradient scaling gradually decreases a pixel-scaling ratio across each frame of virtual reality data, wherein the pixel-scaling ratio is a ratio of a number of pixels in a portion of the frame before scaling to a number of pixels in the portion of the frame after scaling and wherein the gradual decrease in the pixel-scaling ratio monotonically decreases from a 1:1 pixel-scaling ratio at the center of the frame to a reduced pixel-scaling ratio at an edge of the frame of the virtual reality data and the pixel-scaling ratios are the same for concentric locations in the frame;
generate one or more fields of views for each frame of the virtual reality data based on the viewing data for a particular virtual reality device;
encode the virtual reality data for the particular virtual reality device based on the gradient scaling and the one or more generated field of views; and
send the encoded virtual reality data to the particular virtual reality device to improve the quality of the virtual reality data for the particular virtual reality device.

9. The system of claim 8, wherein the virtual reality backend is further configured to adjust one or more quantization parameters that are used to encode the virtual reality data sent back to a particular virtual reality device and determine a characteristic of a lens of the particular virtual reality device and adjust the set of quantization parameters based on the characteristic of the lens of the particular virtual reality device.

10. The system of claim 9, wherein the virtual reality backend is further configured to adjust the set of quantization parameters based on the characteristic of the lens of the particular virtual reality device and a characteristics of the human eye.

11. The system of claim 10, wherein the virtual reality backend is further configured to generate a quantization parameter map.

12. The system of claim 8, wherein the virtual reality backend is further configured to generate one or more field of views having one of different sizes and different shapes.

13. The system of claim 8, wherein the virtual reality backend is further configured to generate the one or more field of views using viewing data over a period of time.

14. The system of claim 13, wherein the viewing data further comprises analytic data that is one of a most viewed scene of the virtual reality data, a heat map of the virtual reality data and a movement of each virtual reality device indicating a scene of the virtual reality data currently being viewed by each virtual reality device to determine an area of the scene in the virtual reality data most viewed and wherein the virtual reality backend is further configured to encode the area of the scene in the virtual reality data most viewed at a higher quality based on the analytic data and encode a plurality of scenes in the virtual reality data that are not most viewed at a lower quality.

15. A virtual reality backend having a processor and memory, comprising:
the processor executing a plurality of lines of instructions of a video quality improvement element and the processor is configured to:
generate a gradient scaling for each frame of the virtual reality data that is a 360 degree view for a view point of a user, wherein the gradient scaling gradually decreases a pixel-scaling ratio across each frame of virtual reality data, wherein the pixel-scaling ratio is a ratio of a number of pixels in the frame before scaling to a number of pixels after scaling and wherein the gradual decrease in the pixel-scaling ratio monotonically decreases from a 1:1 pixel-scaling ratio at the center of the frame to a reduced pixel-scaling ratio at an edge of the frame of the virtual reality data and the pixel-scaling ratios are the same for concentric locations in the frame;
generate one or more fields of views for each frame of a virtual reality data based on viewing data for the virtual reality device wherein the gradient scaling and the one or more generated field of views improve the quality of the virtual reality data for the virtual reality device.

16. The virtual reality backend of claim 15, wherein the processor is further configured to adjust one or more quantization parameters that are used to encode virtual reality data sent back to the virtual reality device and determine a characteristic of a lens of the virtual reality device and adjust the set of quantization parameters based on the characteristic of the lens of the virtual reality device.

17. The virtual reality backend of claim 16, wherein the processor is further configured to adjust the set of quantization parameters based on the characteristic of the lens of the virtual reality device and a characteristics of the human eye.

18. The virtual reality backend of claim 17, wherein the processor is further configured to generate a quantization parameter map.

19. The virtual reality backend of claim 15, wherein the processor is further configured to generate one or more field of views having one of different sizes and different shapes.

20. The virtual reality backend of claim 15, wherein the processor is further configured to generate the one or more field of views using viewing data over a period of time.

21. The virtual reality backend of claim 20, wherein the viewing data further comprises analytic data that is one of a most viewed scene of the virtual reality data, a heat map of the virtual reality data and a movement of each virtual reality device indicating a scene of the virtual reality data currently being viewed by each virtual reality device to determine an area of the scene in the virtual reality data most viewed and wherein the video quality improvement element encodes the area of the scene in the virtual reality data most viewed at a higher quality based on the analytic data and encodes a plurality of scenes in the virtual reality data that are not most viewed at a lower quality.

* * * * *